(No Model.) 2 Sheets—Sheet 1.

W. C. JOHNSTON.
CYCLE.

No. 536,529. Patented Mar. 26, 1895.

WITNESSES:
E. E. Hamill
A. M. Tuttle

INVENTOR
Wm. C. Johnston,
BY
C. B. Tuttle
ATTORNEY.

(No Model.) 2 Sheets—Sheet 2.
W. C. JOHNSTON.
CYCLE.
No. 536,529. Patented Mar. 26, 1895.
Fig. 3
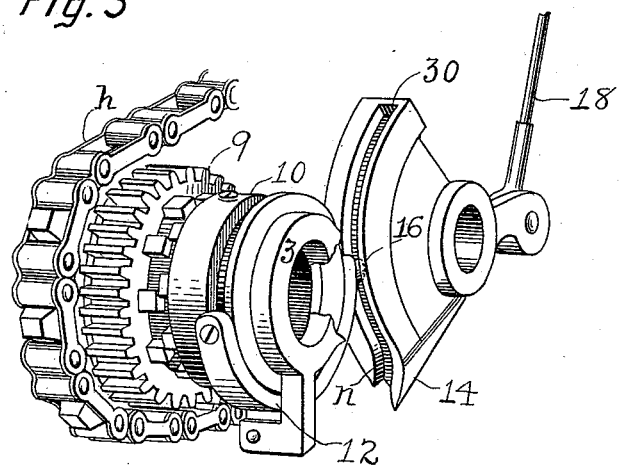
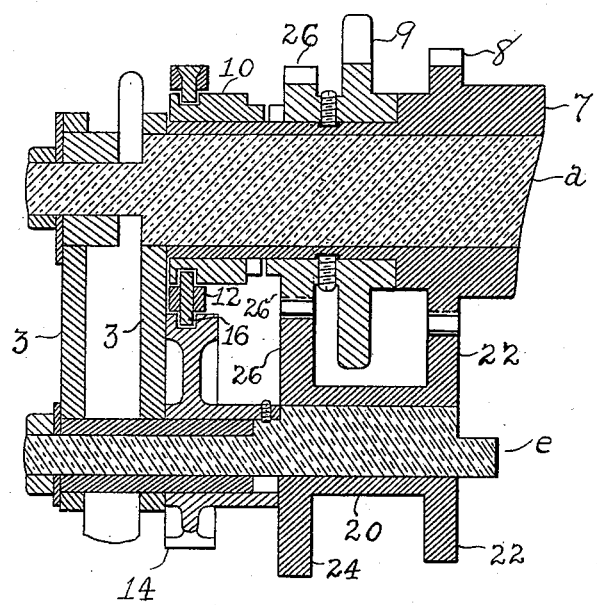
Fig. 4
WITNESSES:
E. E. Hamill
A. M. Tuttle
INVENTOR
Wm. C. Johnston,
BY
C. B. Tuttle
ATTORNEY.

UNITED STATES PATENT OFFICE.

WILLIAM C. JOHNSTON, OF MELROSE, MASSACHUSETTS.

CYCLE.

SPECIFICATION forming part of Letters Patent No. 536,529, dated March 26, 1895.

Application filed February 5, 1894. Serial No. 499,058. (No model.)

*To all whom it may concern:*

Be it known that I, WILLIAM C. JOHNSTON, of Melrose, in the county of Middlesex and Commonwealth of Massachusetts, have invented certain Improvements in Cycles, of which the following, taken in connection with the accompanying drawings, is a specification.

Figure 1:
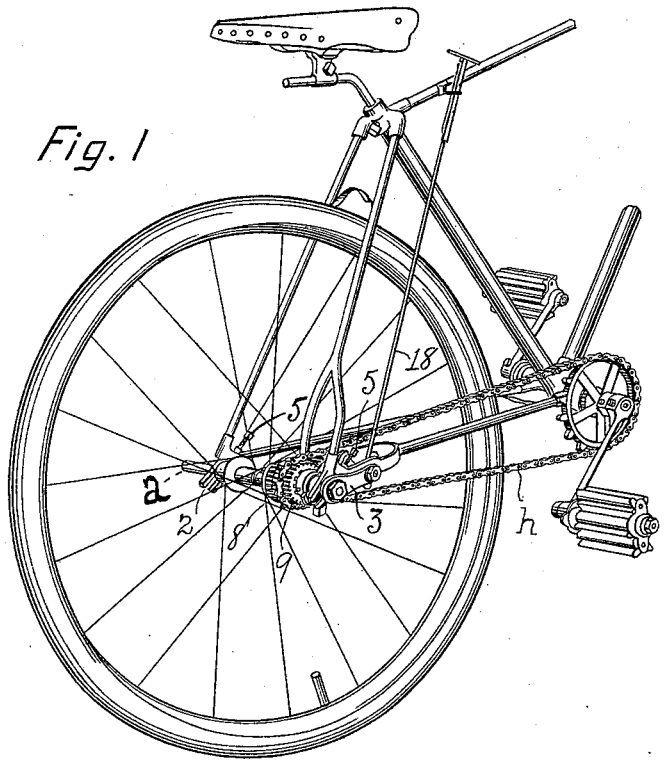
Figure 2:
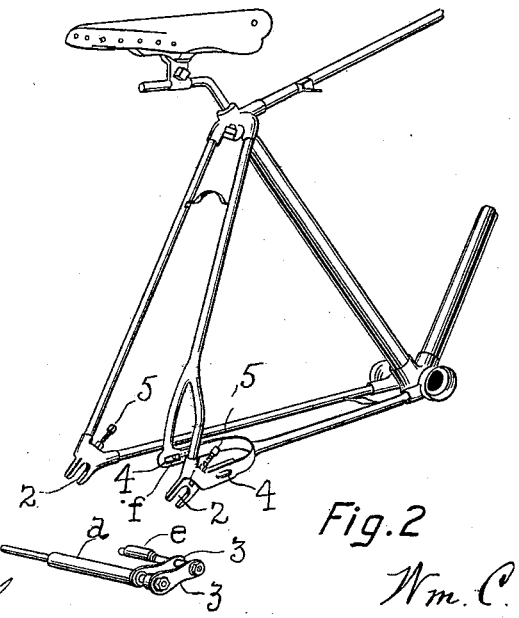

In the accompanying drawings, Figure 1 is a perspective view representing my invention. Figs. 2 and 3 are also perspective views representing details of the invention. Fig. 4 is a sectional plan of the parts comprising this invention and immediately connected therewith.

So much only of the bicycle proper is shown as is required to illustrate this, my present invention, and its mode of combination in a cycle machine.

As represented in the present instance, the seat-supporting rear frame section, (Fig. 2,) is provided with openings, 2, 2, for receiving the road-wheel shaft, $a$, and adjusting devices, consisting of screw-threaded bolts, 5, 5, by means of which the shaft is adjustably movable in its bearings, for the purpose of taking up slack that may occur in the sprocket chain, $h$. Said frame section is further provided with bearings, 4, 4, in which is supported the eccentric shaft, $e$. Straps, 3, 3, connect the shafts, $a$, $e$, at one end and operate to maintain the relative position of these shafts during adjustment, the arrangement being such that a movement of the shaft, $a$, by means of screws, 5, 5, operates through straps, 3, 3, to effect a corresponding movement of the shaft, $e$, the bearings, 4, 4, being formed as shown to permit such movement of shaft, $e$. The relation of said shafts, one to the other, is in this manner maintained while adjustment takes place, after which the screw-threaded bolt, $f$, (Fig. 2,) is suitably adjusted to bear supportingly against the shaft, $e$, at one end, its opposite end being supported by the straps, 3.

The road-wheel is supported to turn on the shaft, $a$. Its hub, 7, carries a fixed gear, 8, and supports the sprocket-wheel, 9, and collar, 10, the hub being, for this purpose, projected, (Fig. 4.) Motion is transmitted to the sprocket wheel from any suitable driving mechanism, through the medium of a sprocket chain, $h$. Said sprocket wheel, 9, is arranged to turn loosely on the hub, 7, and has projecting laterally therefrom teeth adapted for engagement with the correspondingly toothed collar, 10. Said collar rotates with the hub, 7, but has a splined connection therewith, whereby it is adapted to permit movement longitudinally on the hub, for engagement with and disengagement from the sprocket wheel.

Pivotally connected with the straps, 3, (Fig. 3,) is a fork, 12, its ends being projected into a groove suitably formed in the collar, 10, whereby to move the collar endwise on its supporting hub. Said endwise movement is effected through the medium of a cam, 14, which, to that end, is grooved as shown, for receiving a stud, 16, fixed to and projecting from the fork, 12. Said cam, 14, is supported on the eccentric shaft, $e$, (Fig. 4,) and projecting upwardly therefrom to a point conveniently near the rider's seat, (Fig. 1,) is a rod, 18, by lifting and depressing which the rider is enabled to rock the eccentric shaft, $e$, and cam, 14, supported thereupon. The eccentric shaft, $e$, is further provided with a sleeve, 20, which is provided with toothed projections, 22, adapted for engagement with the gear, 8, on the road wheel hub, and also with toothed projections, 24, adapted for engagement with toothed projections, 26, on the sprocket wheel, 9, (Fig. 4.) Said sleeve being supported to revolve on the shaft, $e$, is carried toward and from the road-wheel hub by rocking movements of the shaft, $e$, and to this end it is that the shaft, $e$, is supported eccentrically.

It will now be understood that a downward movement of the rod, 18, operates a rocking movement of the eccentric shaft, $e$, whereby the sleeve, 20, is moved away from the road-wheel hub and the toothed projections, 22, 24, are disengaged from the corresponding toothed projections, 8, 26. Said movement of the rod, 18, further operates a simultaneously rocking movement of the cam, 14, whereby the collar, 10, is moved into engagement with the sprocket-wheel. To this end, the cam path, 30, (Fig. 3,) is formed with a straight portion in which stud, 16, travels during the larger portion of said rocking movement and while the shaft, $e$, is operated to move sleeve, 20, from engagement with toothed projections, 8, 26, of the road-wheel hub, at which time, the stud 16, reaches the grooved portion, n, of said cam path, 30, and is there operated by the cam to move fork, 12, and its collar, 10, toward the sprocket wheel, by which movement the toothed projections of said collar, 10, are meshed with the correspondingly toothed projections of wheel, 9, and the sprocket wheel, being locked thereby, is compelled to turn in unison with the road-wheel hub, during which motion is imparted from the sprocket chain, h, directly through the sprocket wheel, 9, to the road-wheel hub. A counter movement of the rod, 18, operates, first, to disengage collar, 10, from sprocket wheel, 9, leaving the sprocket wheel to turn loosely on the road-wheel hub and continuing, rocks the eccentric shaft, e, causing the sleeve, 20, to move forwardly and toward the wheel hub shaft, whereby its toothed projections, 22, 24, are intermeshed with toothed projections, 8, 26, whereupon motion is imparted to the road-wheel shaft directly from the sprocket wheel through sleeve 20 and its toothed projections to the toothed projections, 8, on the road-wheel hub. Obviously, when the road-wheel is moved directly through the sprocket wheel, the leverage is determined by the relation of said sprocket wheel to the wheel hub, but when the road-wheel is moved indirectly through the gear members of sleeve, 20, the leverage is determined by the relation of said gear members of said sleeve, 20, to the gear members on said sprocket wheel and wheel hub, respectively, so that to obtain a change of leverage in the driving bar, it is only necessary to move the rod, 18, up or down according to the leverage that it may be desirable to attain.

I claim and desire to secure by Letters Patent—

1. In a cycle, the combination with a supporting frame work, of a road-wheel shaft, supported adjustably therein, a road-wheel, mounted on said shaft, a sprocket wheel journaled to turn loosely on the hub of said road-wheel, a driving mechanism to turn the sprocket wheel, a second shaft supported adjustably in said frame-work, a power transmitting mechanism interposed between the sprocket wheel and road-wheel on said second shaft, through which motion is transmitted from the sprocked wheel to move the road-wheel and devices for moving the road-wheel shaft, adjustably, devices engageable with the road-wheel shaft and said second shaft, whereby the relation of one to the other is maintained, during the adjustable movements, substantially as described.

2. In a cycle, the combination with the frame-work and operating devices substantially as described, of the shafts, a, e, supported to permit adjustable movements in said frame-work, devices engageable with one of said shafts for moving it adjustably, and connections engaging with said shafts, whereby the movements of one are made conformable to the adjustable movements of the other, substantially as described.

3. In a cycle, the combination with the frame-work and operating devices substantially as described, of the shafts, a, e, supported to permit adjustable movements in said frame-work, devices engagable with the shaft, a, to move it adjustably, strap connections between the shafts, a, e, at one end and the adjustable device to bear against the opposite end of shaft, e, substantially as described.

4. In a cycle, the combination of a road-wheel having a gear on the hub thereof, a sprocket wheel journaled to turn loosely on the hub of the road-wheel, a shaft supported eccentrically to permit rocking movements a sleeve supported to turn loosely on said shaft, a gear on said sleeve, adapted to engage with a suitably formed gear on said sprocket wheel, also a gear on the sleeve adapted for engaging a gear on said road-wheel hub, a movable locking device securing the sprocket wheel to the road-wheel hub and movable connections, whereby said locking device is moved to engage or disengage the sprocket wheel, whereby said eccentric shaft is simultaneously rocked, to move the sleeve, 20, from or toward the road-wheel hub, substantially as described.

5. In a cycle, the combination of a road-wheel having a gear on the hub thereof, a sprocket wheel journaled to turn loosely on the hub of said road-wheel, a shaft supported eccentrically and permitting rocking movements in the cycle frame-work, a sleeve supported to turn loosely on said shaft, a gear on said sleeve, adapted to engage the gear on said sprocket wheel, and also a gear on said sleeve, adapted to engage gear on said road-wheel hub, a locking device consisting of a toothed collar supported on the wheel hub to revolve therewith and also movable thereon to engage its toothed projections with the sprocket wheel for securing the sprocket wheel to the road-wheel and movable connections whereby said locking device is made to engage or disengage the sprocket wheel and whereby said eccentric shaft is simultaneously rocked to move the sleeve, 20 toward and from the road-wheel hub, substantially as described.

Signed at Lynn, Massachusetts, this 20th day of January, A. D. 1894.

WILLIAM C. JOHNSTON.

Witnesses:
E. E. HAMILL,
C. B. TUTTLE.